United States Patent [19]

Dufrene

[11] 4,044,470
[45] Aug. 30, 1977

[54] COLLAR LOCATING APPARATUS

[76] Inventor: Alex Dufrene, P.O. Box 194, Des Allemands, La. 70030

[21] Appl. No.: 649,440

[22] Filed: Jan. 15, 1976

[51] Int. Cl.² .......................... E21B 47/04; G01B 5/18
[52] U.S. Cl. ..................................... 33/125 R; 166/64
[58] Field of Search ................. 33/125 R, 126, 141 G, 33/178 F; 73/151; 166/64

[56] References Cited

U.S. PATENT DOCUMENTS

| 1,893,600 | 1/1933 | Shull | 33/125 R |
| 2,766,533 | 10/1956 | Brandon | 33/178 F |
| 2,854,758 | 10/1958 | Owen | 33/178 F |
| 2,960,165 | 11/1960 | Schrann | 166/64 X |
| 3,474,539 | 10/1969 | Moore | 33/126 |
| 3,902,361 | 9/1975 | Watson | 73/151 |

Primary Examiner—Charles E. Phillips
Attorney, Agent, or Firm—Donald Gunn

[57] ABSTRACT

A collar locating apparatus is disclosed. It is a wire line tool adapted to be run in a tubing string to count the number of collars and thereby determine depth. It incorporates an elongate body. It has a pair of caliper arms which are spring loaded to flare outwardly. The device is run to the bottom of the tubing string and is jar operated to sever a shear pin whereupon the caliper arms are released to deflect outwardly. The extent of deflection of the arms is determined by an adjustable nut below the arms which slides downwardly on the body and releases the arms for controlled outward deflection. The arms are pivoted and clamped at a common collar above the arms to enable them to pivot.

7 Claims, 8 Drawing Figures

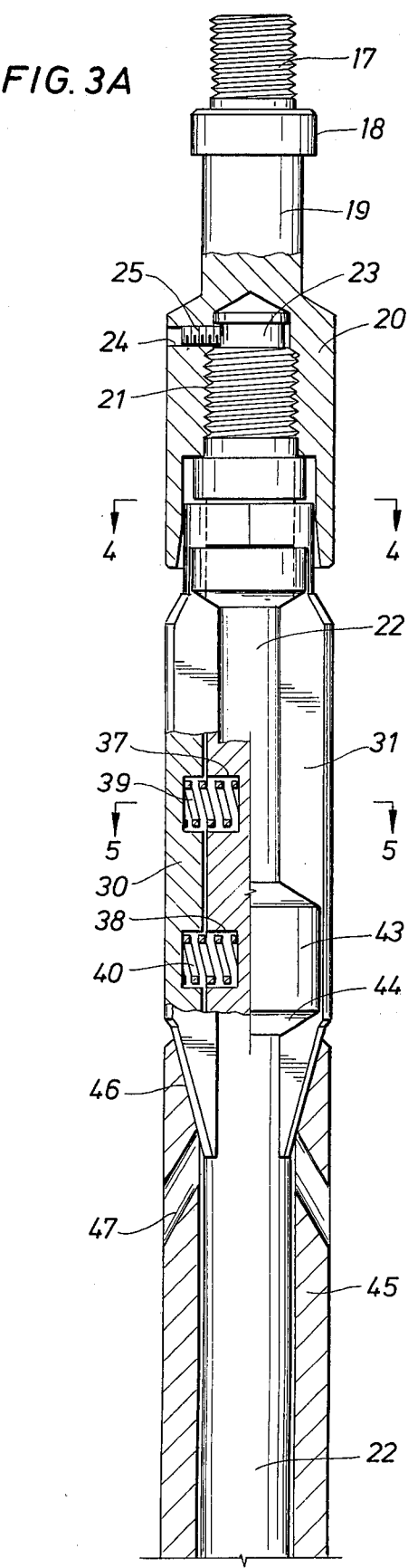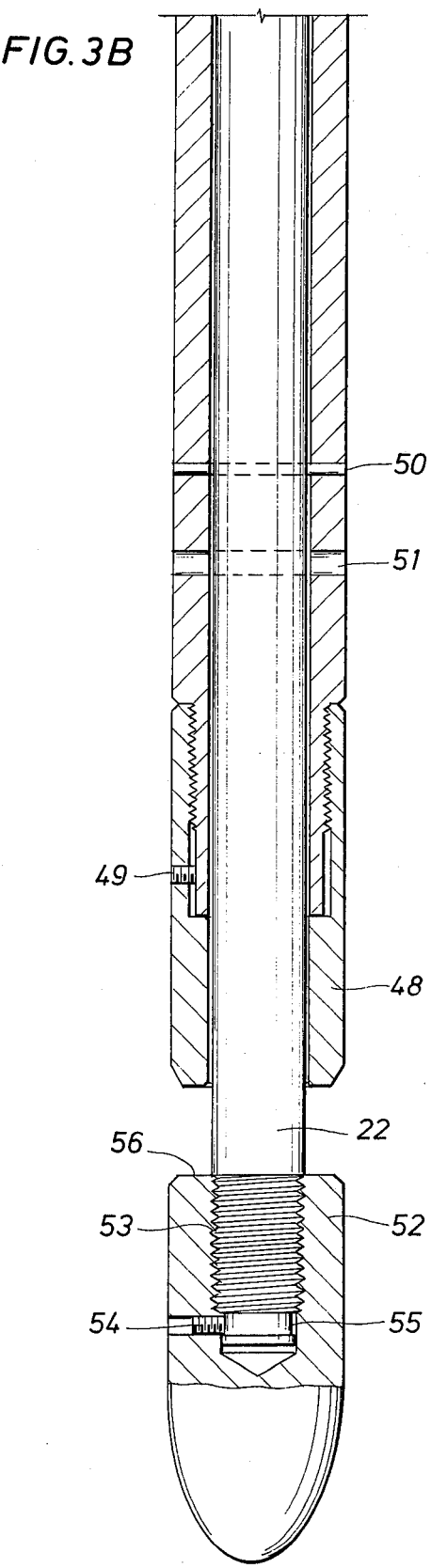

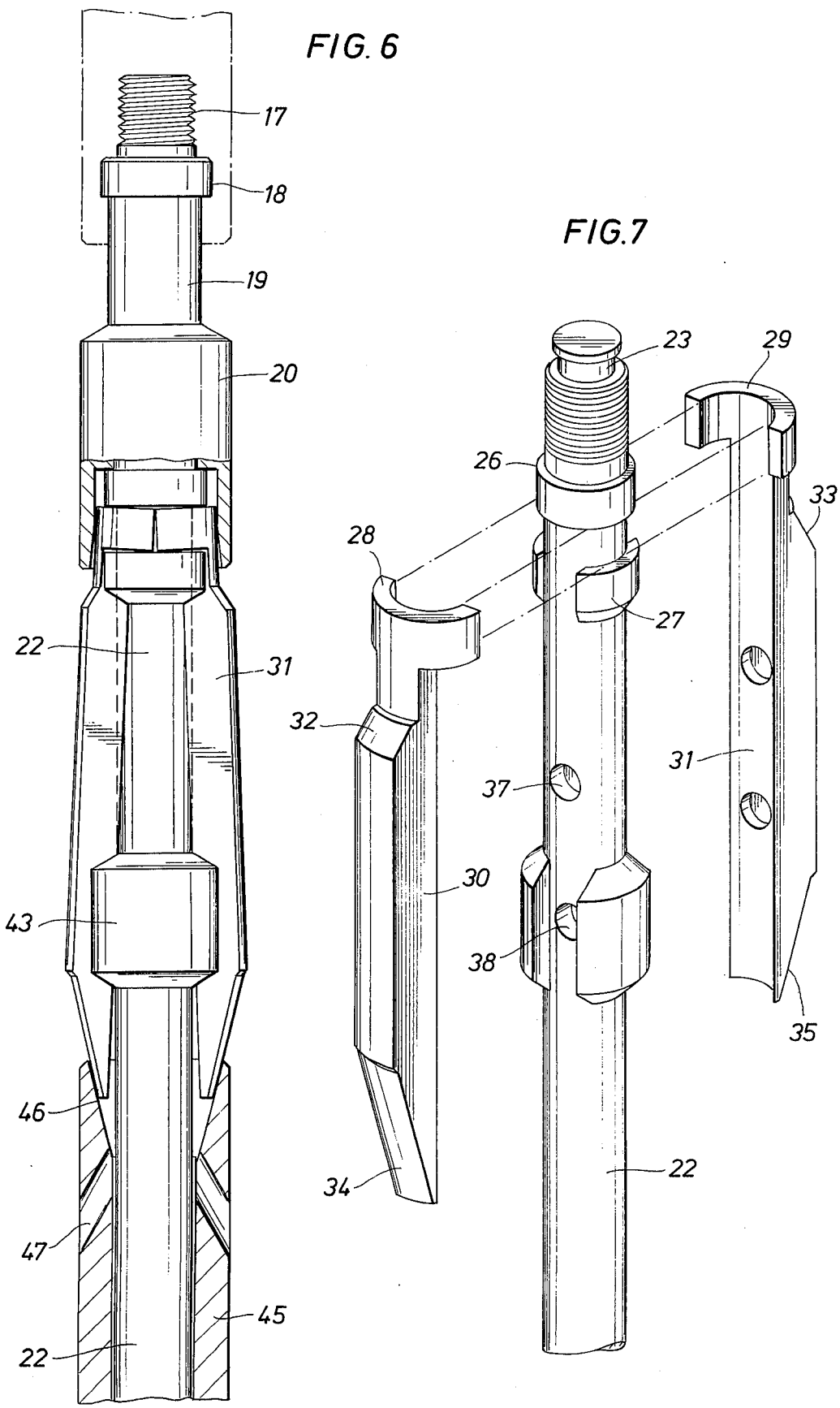

4,044,470

COLLAR LOCATING APPARATUS

BACKGROUND OF THE INVENTION

It is necessary to perform many tasks down hole of a completed tubing string. These tasks ordinarily must be performed at specified elevations. In many instances, it is difficult if not impossible to determine the elevation at which a job must be performed. The device of the present invention is a collar locator which enables a wire line operator to determine the elevation at which a particular job must be performed. The device of the present invention particularly enables the operator to run the tool through the well to the bottom of the well. It is useful in a perfectly vertical wells and in slant holes also. Moreover, it preferably operates on the return trip under tension. The downward trip where the tool is dropped into the well is some what problematic inasmuch as the wire line may develop slack in the cable and may not travel smoothly from collar to collar on the gravity ball. Thus, the device is particularly useful in that it can be dropped to the bottom of a tubing string. It is then triggered into a state of readiness by use of a jar device run on the wire line with the tool. At this juncture, it is then ready to operate and is pulled from the well with tension on the wire line. When it is pulled, accurate measurements are derived from the wire line that is retrieved at the surface.

The tension on the wire line is easily monitored and the amount of pull required to retrieve the tool varies each time the tool passes through a collar. This determines the number of collars passed to a specified location. This will determine the distance of a specified location from the bottom of the well and will enable the performance of a specified job or task at that location.

SUMMARY OF THE INVENTION

This apparatus is a wire line tool which incorporates a pair of caliper arms which are spring loaded to move outwardly and engage collars as the tool traverses a tubing string. It incorporates an elongate body carried on a wire line. The pair of caliper arms are pivotally mounted at their upper end on the interior of a sleeve. Transversely extending coil springs force them outwardly. At their lower ends, they are tapered. The tapered edges are engaged by a pinned sleeve. The sleeve is moved to its upper position to lock the caliper arms against movement. When the tool is jarred, the shear pin is broken, thereby permitting the sleeve to drop downwardly. This enables the caliper arms to spring outwardly by an amount determined by the setting of a nut attached to the lower end of a sleeve which controls its travel.

DESCRIPTION OF THE DRAWINGS

FIGS. 3A and 3B jointly are a lengthwise sectional view through the collar locator apparatus illustrating details of construction;

FIG. 6 is a view of the upper end of the tool to be contrasted with the arrangement of FIG. 3A where the calipered arms are sprung outwardly; and FIG. 7 is an exploded view of the upper end of the body and the calipered arms showing how they assemble together.

DESCRIPTION OF THE PREFERRED EMBODIMENT

Figure 1:
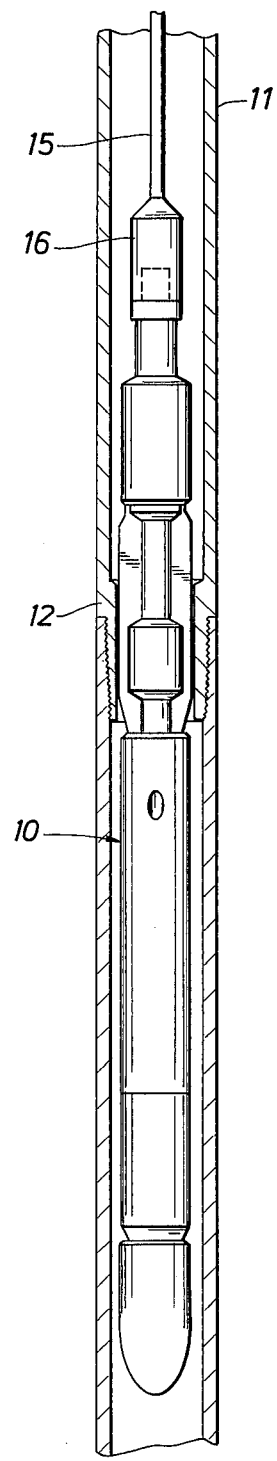
FIG. 1 shows the collar locating apparatus of the present invention in a tubing string having internal upset collars.
Figure 2:
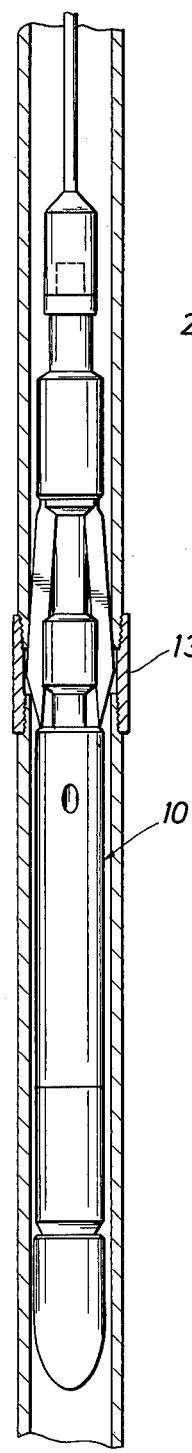
FIG. 2 is similar to FIG. 1 showing the tool locating an external collar where an internal recess is formed adjacent to the collar.

Attention is directed to FIG. 1 of the drawing where the collar counting apparatus of the present invention is indicated by the numeral 10 shown adjacent to an internal collar 12. By contrast, FIG. 2 shows an alternate form of tubing string where the collar 13 is on the exterior and the tool 10 is adjacent to an internal void. The collar locator 10 is able to locate as in the manner of FIG. 1 or can find collars characterized by an internal void.

The collar locator 10 is typically run on a wire line 15. The wire line tool includes a socket 16 which enables the collar locator 10 to be connected for running. It is preferably run with the wire line equipment (e.g. jars) above the collar locator 10 but they have been omitted for sake of clarity.

The socket 16 supports the collar locator by threading to a neck 17 shown in FIG. 3A. It is immediately adjacent to a large protruding shoulder 18 which defines a fishing neck for retrieval of the collar locator should it be dropped in the drill string. A narrow neck 19 is below the enlargement 18. The neck 19 connects to an enlargement or bushing 20 which is axially hollow and internally threaded at 21. The threads 21 enable the bushing 20 to thread to and engage an elongate tubular body 22. The body 22 is a solid mandrel which extends the full length of the tool. The mandrel 22 is threaded at its upper end to engage the threads 21 and the bushing 20.

The mandrel 22 has an undercut shoulder at 23. The undercut 23 is immediately adjacent to a larger shoulder to define an encircling groove. A lateral opening 24 is drilled and tapped to intersect the mandrel 22 at the undercut 23. This enables a set screw 25 to be threaded into the tapped opening 24 which locates the set screw to protrude into the undercut 23. This locks the mandrel against unthreading. The set screw must be first removed before the mandrel 22 can be unthreaded.

Figure 4:
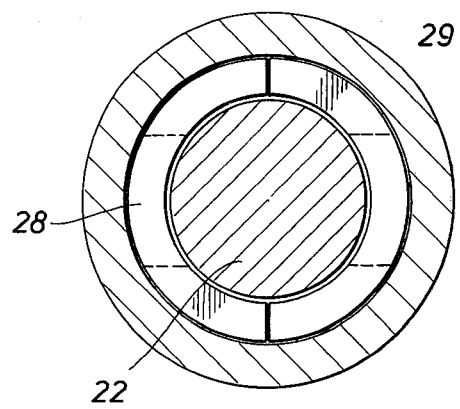
FIG. 4 is a sectional view along the line 4—4 of FIG. 3A showing details of construction of a hanger apparatus for the caliper arms shown in FIG. 3A.

The mandrel 22 is better shown in FIG. 7. In FIG. 7, it is shown to include an encircling enlargement 26. The enlargement 26 is sized to fit with in the bushing 20. A second enlargement extends around the mandrel 22 and is identified by the numeral 27. However, it does not fully extend around the mandrel. Rather, it is interrupted at two locations. The encircling shoulder 26 and the lower shoulder 27 define a fairly narrow gap. The gap permits the mandrel 22 to receive a split ring formed of the half ring segments 28 and 29 identified in FIG. 7. The half ring segments fit loosely around the mandrel 22. The split ring has a vertical height to enable it to fit just between the encircling shoulder 26 and the interupted shoulder 27. The split ring is shown in two parts which are joined together to define the full ring as best illustrated in FIG. 4.

The left half ring 28 supports a caliper arm 30. It has a straight inside face which abuts the mandrel 22. A similar caliper arm 31 is also shown in FIG. 7 supported by the half ring 29. The arms 30 and 31 extend parallel to the mandrel 22 and have a contoured inside face which enables them to substantially encircle the mandrel. They do not fully encircle the mandrel because it is not necessary to make them that large. It will be observed that the caliper arm 30 is provided with a tapered shoulder 32 at the upper end and a longer tapered shoulder 34 at the lower end. Similar shoulders 33 and 35 are provided on the other caliper arm. The several shoulders taper to a lengthwise enlargement on the exterior which protrudes outwardly from the arms. This is more accurately shown in FIG. 6.

Figure 5:
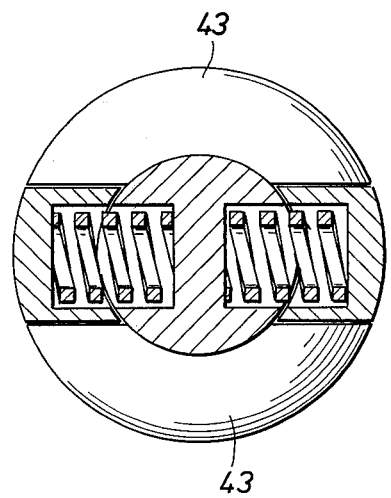
FIG. 5 is a sectional view along the line 5—5 of FIG. 3A showing the arrangement of a resilient spring in the body bearing on the caliper arms.

The mandrel 22 is shown in FIG. 7 to include transverse passages at 37 and 38. The passages 37 and 38 are relatively shallow as shown in FIG. 5 and are duplicated on both sides of the mandrel 22. They could be drilled all the way through but there is no particular gain in so doing.

Compressed coil springs at 39 and 49 are shown in FIG. 3A. They force the arm 30 outwardly. The arm 30 is free to deflect outwardly pivoting about the half ring 28 at the upper end. The half ring 28 is caught between the shoulders 26 and 27 on the mandrel 22 as shown in FIG. 3A. The bushing 20 encircles the half ring and is undercut at a tapered angle to permit some deflection of the half ring. The arm 30 thus pivotally moves at its lower end and rotates in a clock wise direction as viewed in FIG. 3A. The arm 31 functions in like manner and rotates in a counter-clockwise direction. It too is spring urged outwardly away from the mandrel 22. As a consequence, the two caliper arms deflect outwardly to contact the tubing string in the manner to be described.

The mandrel 22 incorporates an enlargement 43. The enlargement 43 does not extend fully around the mandrel 22. Rather, it is interrupted on both sides as shown in FIG. 5. The enlargement 43 serves as a guide on the calipered arms. It aligns them as they near the mandrel and prevents lateral deflection. The enlargement 43 is cut with vertical channels on opposite sides as shown in FIG. 5 to capture the lower ends of the arms. Thus, they are guided to move radially outwardly within a common plane with the mandrel 22.

In FIG. 3A, the numeral 45 identifies a sleeve about the mandrel. The sleeve 45 has a shoulder 46 cut on its inner upper end which encircles the tapered shoulders 34 and 35 of the arms. The sleeve 45 in its uppermost position clamps the arms 30 and 31 against any deflection. As the sleeve is moved downwardly, the tapered shoulder 46 moves away from the tips of the arms and permits them to swing further outwardly.

The sleeve 45 incorporates a wash hole 47 shown in FIG. 3A. It permits the tool to be rinsed and washed easily. Preferably, two or three wash holes are included and they extend downwardly at an angle to enable drainage from the moving parts.

At the lower end of FIG. 3B, an adjustable nut 48 is illustrated. It is threaded to the sleeve 45 and has a common diameter on the exterior and interior. The two are joined together by a set of threads. The precise position of the nut 48 is adjusted by the operator. It is shown at its upward limit of travel in FIG. 3B. It can move downwardly from the illustrated position. The nut 48 is located at a specific position and then it is fastened at that position by use of a set screw 49. The nut 48 is threadably adjusted to determine the overall length of the sleeve 45. The function of the nut 48 will be made readily apparent by the description included below.

The sleeve 45 is pinned to the mandrel 22 by a lock means in the form of a sacrificial shear pin 50. An additional passage is incorporated at 51 which extends through the sleeve and the mandrel. It is preferably used to insert a lever to hold the two together to permit the nut 48 to be threaded about the sleeve 45. The shear pin 50 is sized and made of a suitable material to pin the sleeve in the upward or illustrated position of the drawings. It is sheared on a jarring force applied to the tool. When the pin 50 is sheared, the sleeve 45 drops downwardly. When it drops, it travels to an abutting position against a bottom sub 52. The sub 52 is threaded to the mandrel 22 by a set of threads 53. It is held against unthreading by a set screw 54 which engages an undercut 55 at the lower end of the mandrel. The sub 52 has an upwardly facing shoulder 56 which limits the downward travel of the sleeve 45 and the adjustable nut 48.

The travel of the sleeve 45 is thus determined by the adjustable nut 48. When the pin 50 is sheared, the sleeve falls downwardly by gravity by distance determined by the position of the nut.

The nut 48 is used to adjust the amount by which the arms 30 and 31 deflect outwardly. When the tool is run into the well, the sleeve 45 is pinned up as illustrated in FIG. 3A and this pulls the arms in against the mandrel 22. After jarring impact, the sleeve 45 falls downwardly when the pin 50 is sheared. The movement of the sleeve 45 is determined by the position of the nut 48. This permits the arms to defect outwardly by an amount determined by the setting of the nut. The sleeve 45 engages the tapered edges 34 and 35 of the deflectable arms.

The tool 10 is used in the following manner. It is run in a well to the bottom of a tubing string. At the bottom of the string, the wire line is manipulated to impart a jarring impact of the tool, accentuated by the use of an oil or mechanical jar, and the pin 50 is sheared. The arms 30 and 31 deflect outwardly as the sleeve 45 falls downwardly to a specified height. In the deflected position the arms assume the posture illustrated in FIG. 6. The precise extent of the deflection of the arms is determined by the tubing while the tool is pulled up from the bottom of the well. Each time it passes through a collar a change in the load of the wire line 15 is noted at the surface. Where the collar has an internal upset as depicted in FIG. 1, the arms increase the drag or weight sensed on the wire line. For instance, if the tool weighs 20 kilograms, the drag might add another 10 or 20 kilograms to the load on passing through the collar.

In the event that the collars are located on the exterior as depicted in FIG. 2, the arms are adjusted so that they drag slightly. Thus, the tool might weigh 20 kilograms and the drag created by the arms engaging the casing would add 10 kilograms when the tool is pulled upwardly. When the collar 13 is encountered, the drag force will drop substantially, almost to zero. This provides a change in load on the wire line 15 which is sensed at the surface.

As shown in FIG. 6, the spring loaded caliper arms move radially outwardly. The same tool can be used for different internal diameters by the substitution of arms 30 and 31 which are constructed with a different arm thickness.

The collar counter 10 of the present invention is thus used advantageously on retrieval from the bottom of the tubing string. It is able to count the several collars in the string counting from the bottom up to enable location of a particular elevation in the tubing string to be determined.

The foregoing is directed to the preferred embodiment of the present disclosure and illustrates how it may be used in different types of tubing. The scope is determined by the claims which follow.

I claim:

1. Collar locating apparatus adapted to be run in a tubing string to locate collars therein which apparatus comprises:
   a. and elongate body;
   b. a pair of opposing, resiliently urged arms;
   c. spaced first and second shoulders facing one another on said body and defining a portion therebetween of reduced relative diameter;
   d. a ring segment appended to each arm and positioned between said first and second shoulders, said ring segments mounting said arms for pivotal movement from a first to a second position where the first position is closer to said elongate body and the other position is outwardly deflected from the first position;
   e. resilient means bearing against said arms to urge said arms to said deflected position;
   f. clamp means carried on said elongate body and slidably movable axially of said body to clamp said arms, said clamp means further being constructed and arranged to adjustably vary the clamping achieved on said arms wherein said arms deflect by differing amounts on moving to the deflected position dependent on the position of said clamping means and lock means for locking said arms in the retracted position during downward movement of the tool in the tubing string by holding said clamp means in its upward most position so that said arms are in said first position and wherein said lock means is releasable to enable said arms to deflect outwardly from said body.

2. The apparatus of claim 1 including a tapered face on each of said arms and wherein said clamp means comprises a ring slidably positioned adjacent to said faces and said ring varies the point of contact to thereby vary the degree of deflection of said arms.

3. The apparatus of claim 1 including a compressed coil spring means bearing on said arms to deflect them outwardly.

4. The apparatus of claim 1 wherein said lock means comprises a shear pin to restrain said arms.

5. The apparatus of claim 4 including a ring which functions as said clamp means; said clamp means comprising said ring co-acting with a tapered face on said arms to enable said arms to deflect outwardly dependent in amount on the relative closeness of said ring to said arms, and wherein said ring is limited in location by a movable limit nut on said elongate body.

6. The apparatus of claim 5 including a tapered inside face on said ring contacted against said arms.

7. The apparatus of claim 5 wherein said second shoulder on said body is notched to permit said arms to extend therethrough and including an encircling, overhanging sleeve about said ring segments to lock them between said first and second shoulders.

* * * * *